(12) United States Patent
Beholz

(10) Patent No.: US 7,022,291 B1
(45) Date of Patent: Apr. 4, 2006

(54) APPARATUS FOR TREATING POLYMERIC MATERIAL TO IMPROVE SURFACE ADHESION

(76) Inventor: Lars G. Beholz, 3209 Cranbrook Cir., Flint, MI (US) 48507

( * ) Notice: Subject to any disclaimer, the term of this patent is extended or adjusted under 35 U.S.C. 154(b) by 649 days.

(21) Appl. No.: 10/104,885

(22) Filed: Mar. 22, 2002

(51) Int. Cl.
*C01F 8/06* (2006.01)
*B05D 3/10* (2006.01)

(52) U.S. Cl. .................... 422/129; 118/58; 118/61

(58) Field of Classification Search ............ 422/129; 427/533, 308, 444; 525/337; 118/58, 61
See application file for complete search history.

(56) References Cited

U.S. PATENT DOCUMENTS

| | | | |
|---|---|---|---|
| 3,869,303 A * | 3/1975 | Orlov et al. | 427/307 |
| 4,835,016 A * | 5/1989 | Rosty et al. | 427/307 |
| 5,053,256 A * | 10/1991 | Haag | 427/307 |
| 6,077,913 A | 6/2000 | Beholz | 525/337 |
| 6,100,343 A | 8/2000 | Beholz | 525/337 |
| 6,830,784 B1 * | 12/2004 | Gutowski et al. | 427/533 |

FOREIGN PATENT DOCUMENTS

CA 2325732 * 3/1999

* cited by examiner

*Primary Examiner*—N. Bhat
(74) *Attorney, Agent, or Firm*—Young & Basile, P.C.

(57) ABSTRACT

An apparatus for treating polymeric sheet material to improve surface adhesion thereof. The apparatus comprises a preheating station, a treatment station, a rinsing station, a drying station and a reeling station. In the treatment station spray nozzles are used to contact a surface of the material with an oxidizer (NaOCl) and an activator (succinic acid) at an elevated temperature to shorten the treatment time. A spent treatment disposal system is disclosed along with a scrubber for cleaning the atmosphere of the treatment and rinsing stations. Alternatively, treatment is accomplished in a heated, agitated bath.

19 Claims, 3 Drawing Sheets

APPARATUS FOR TREATING POLYMERIC MATERIAL TO IMPROVE SURFACE ADHESION

FIELD OF THE INVENTION

This invention relates to the treatment of polymeric material to improve surface adhesion and more particularly to an apparatus for performing such a treatment.

BACKGROUND OF THE INVENTION

In my U.S. Pat. No. 6,077,913 issued Jun. 20, 2000 and U.S. Pat. No. 6,100,343 issued Aug. 8, 2000 I disclose a method for treating polymeric materials to improve the surface adhesion thereof to paints, adhesives, films, laminates, metallic layers and bonding agents. In general that method involves contacting the polymeric material with a fluid containing at least one oxidizing agent which is present in a kinetically degrading state capable of producing at least one chemical intermediate which is reactive with the polymeric material. Contact between the fluid containing the oxidizing agent and polymeric material is maintained for an interval sufficient to modify functional groups present in the polymeric material proximate the surface being treated. The oxidizing agent of choice is a halogenated bivalent oxygen compound capable of a controlled rate of oxidation and capable of activation to yield the desired kinetically degrading state. The oxidizing agent is activated by an acid containing a chemical compound which has at least one carboxylic acid group, a carboxylic acid derivative, or synthetic equivalents thereof.

I incorporate the disclosures of the aforesaid United States patents into this document in their entireties by reference.

SUMMARY OF THE INVENTION

The present invention is an apparatus or system for treating polymeric material, whether it be sheet material or discrete articles, pallets, grains and powders to improve the surface adhesion of at least portions thereof in a manner suitable for industrial application.

In general the apparatus of the present invention includes means for feeding polymeric material or articles to be treated through a series of treatment stations. The apparatus further comprises a first station, preferably including an enclosure for isolating the station from the surrounding atmosphere, in which a surface of the material or article is contacted with an oxidizing agent and an activator for an interval of time sufficient to impart functional groups derived from said oxidizing agent onto a surface of the polymeric material or article. The oxidizing agent is a bivalent oxygen compound selected from the group consisting of oxycompounds of chlorine, oxycompounds of chromine, oxycompounds of iodine, oxycompounds of boron, oxycompounds of nitrogen and mixtures thereof.

The apparatus further comprises a second station adjacent the first station for rinsing the oxidizing agent and activator from the material and/or articles and a further means for disposing of the oxidizing agent and the acid in an environmentally acceptable manner.

In the preferred form, the apparatus further comprises a preheating station which is upstream of the primary treatment station to preheat the material or articles so that they reach the treatment station at a sufficiently elevated temperature as to shorten the time necessary for contact treatment. In the preferred forms the treatment contact is carried out by means of multiple spray nozzles having integrated heaters to elevate the temperature of the contacting treatment reagents and further shorten the time required to produce the desired functionalization of the polymeric material, or by immersion of the material or parts in a heated bath which is agitated and maintained at a reactive level.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
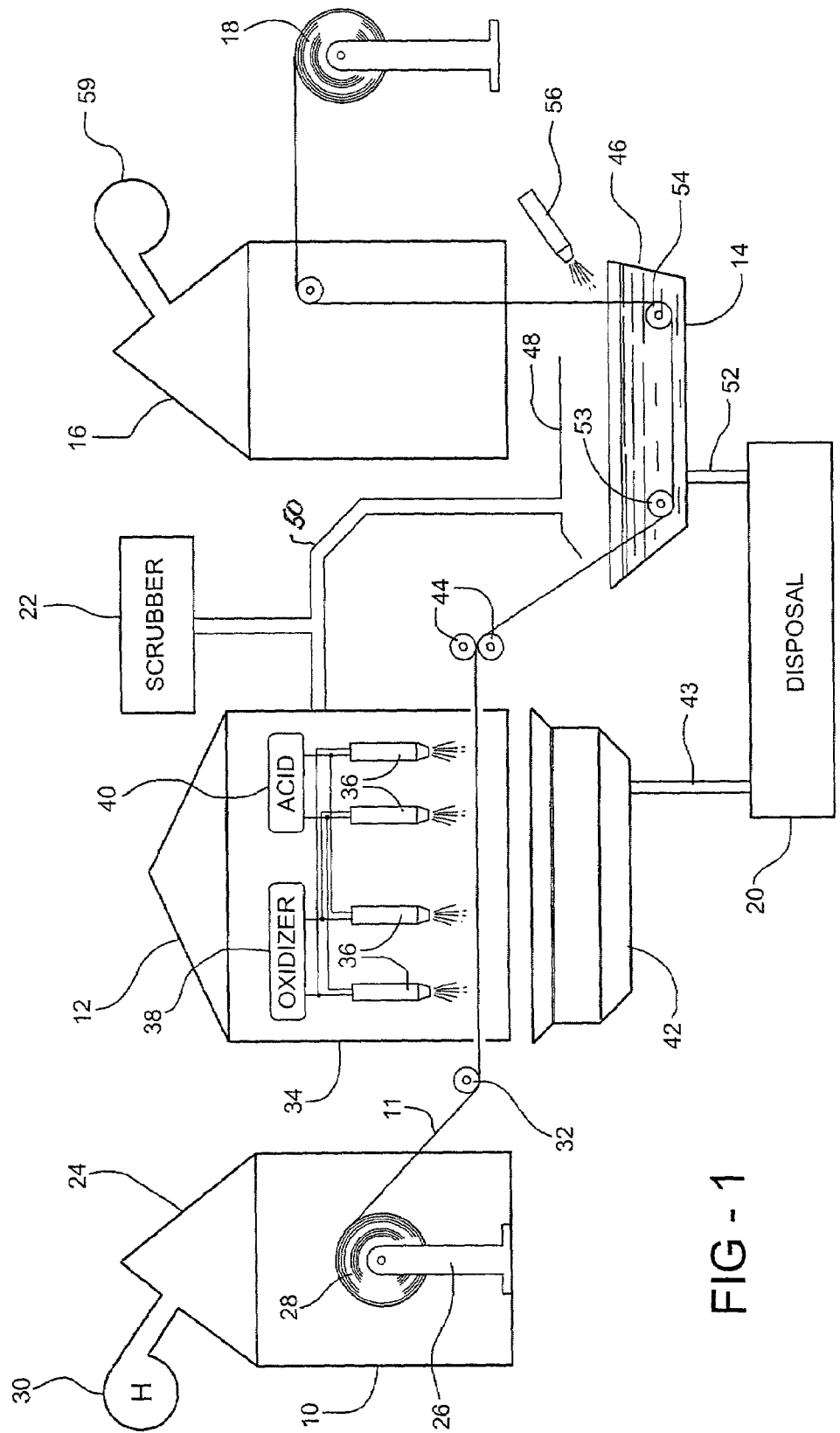
FIG. 1 is a schematic diagram of an apparatus for treating sheet material by spray contact in accordance with the present invention.

Referring now to FIG. 1, there is shown an apparatus for treating sheet polyethylene material 11 to improve the surface adhesion thereof. The apparatus comprises, in this illustrative embodiment, apparatus for feeding the material 11 from a feed roll 28 through a series of treatment stations comprising a preheating station 10, a spray treatment contacting station 12, a rinsing station 14 and a drying station 16 to a rewinding station 18. In addition the system of FIG. 1 comprises a disposal system 20 for treating the spent chemicals used in the treatment station 12 and an air scrubber 22 the details and purposes of which are hereinafter described.

The preheating station 24 is preferably formed by a suitable enclosure large enough to hold a roll 28 of sheet polyethylene material 11 in an industrial quantity; e.g., a roll of approximately 200 ft. in length. The roll 28 is disposed on a power de-reeling stand 26 located within the enclosure 24. Heated air is supplied to the enclosure 24 by means of a gas blower 30 having a conventional thermostatic control. The temperature within the preheating enclosure is preferably on the order of 100–150° F., but may be higher if suitable construction materials are used.

Figure 4:
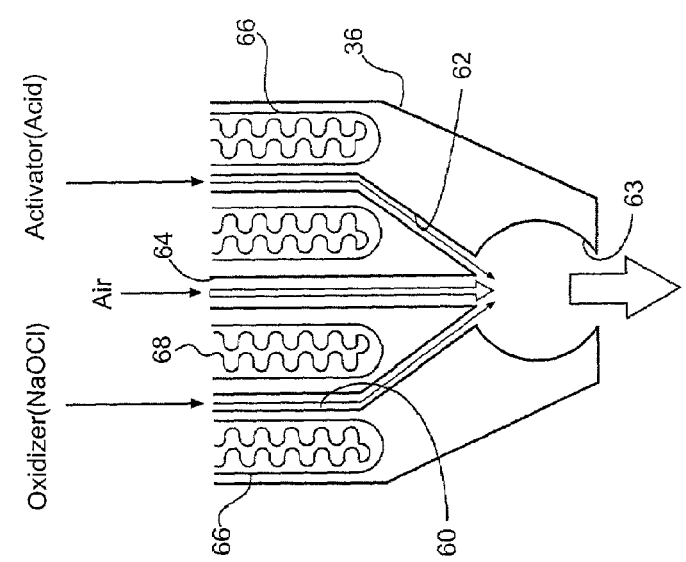
FIG. 4 is a diagram of the nozzle arrangement in FIG. 1.

From the preheating station 10 the material 11 passes under an idler roller 32 and into an enclosure 34 which defines the primary treatment station 12. Within the enclosure 34 are four banks of spray nozzles 36 preferably six or eight across the sheet of material 11 for a total of twenty-four to thirty-two spray nozzles as shown in perspective in FIG. 4. Each of the nozzles 36 is connected to a supply 38 of oxidizer agent and a supply 40 of activator. In the preferred embodiment, the oxidizer in the supply 38 is NaOCl and the acid is an aqueous succinic acid solution. The treatment liberates chlorine gas which is scrubbed from the atmosphere by means of a conventional air scrubber 22 designed for the removal of said effluent gas suitable scrubbers are available from Purafil or Doraville, Ga. and from AEA Technology Products and Systems, the latter providing products under the trade name "V-Tex."

The spent treatment materials flow over the upper surface of the material 11 and thereafter into a catch basin 42 located beneath the treatment station 12. The basin 42 is connected by means of a plastic conduit 43 to the disposal system 20 which is hereinafter described in greater detail.

After passing through the treatment station 12 and being exposed to the oxidizing agent and the activator for sufficient interval, the material 11 passes over a roller 44 and into a rinse bath 46 at the rinsing station 14. The bath is typically an aqueous solution containing moieties capable of neutralizing both the residual acid and chlorine. The station 14 comprises additional idler rollers 53 and 54 to hold the material 11 at a sufficient depth in the rinse water to ensure thorough rinsing. The rinse bath 46 is preferably covered by a tent-like enclosure 48 which is connected by means of plastic conduit 50 to the air scrubber 22 to deal with any remaining chlorine gas that may be liberated during the rinsing process.

From the rinse bath 14 the material 11 travels upwardly past a water spray 56 which performs a final rinsing step into the enclosure forming station 16 where it is dried by the movement of heated air provided by a blower 59. The material then passes around the roller 58 to an exit point and onto the power reel 18.

Figure 2:
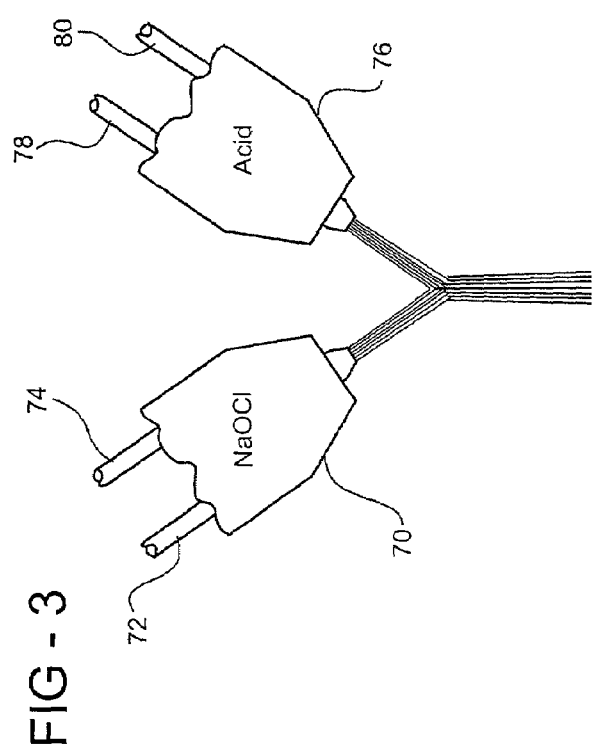
FIG. 2 is a cross-sectional view of a spray nozzle useful in the system of FIG. 1.

Looking now to FIG. 2 a preferred form of the nozzles 36 is shown to comprise a structure having separate passages 60 and 62 for the NaOCl and an aqueous succinic acid activator. The passages 60 and 62 enter a mixing chamber 63 from which the mixed combination of chemicals emerges and is directed onto the material 11 by an air stream passing through channel 64. Heater coils 66 and 68 surround the passages 60 and 62 to elevate the temperatures of the chemicals entering the mixing station 63 to a temperature of between approximately 120°–200° F.

Figure 3:
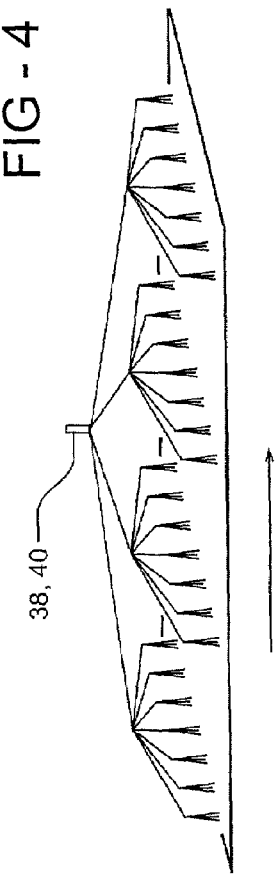
FIG. 3 is an alternative spray nozzle useful in the system of FIG. 1.

FIG. 3 shows an alternative arrangement comprising a first nozzle 70 having a supply line 72 for the NaOCl and a second supply line 74 for atomizing air. The FIG. 3 apparatus further comprises a second nozzle 76 having a supply line 78 for the aqueous succinic acid solution and a separate supply line 80 for the atomizing air. The nozzles 70 and 76 are aimed in such a way as to bring the two output streams together for contact mixing and direct application to the polymeric surface to be treated.

It will be understood that various substitutions and modifications of the apparatus components described above may be used. The dual impingement spray technology is preferred but sequential application of the oxidizer and activator is also possible. The spray or immersion chamber 12 is isolated from the balance of the facility because of the liberation of the chlorine gas during the course of the reaction. It is preferably made of plastic panels or plastic coated panels to control corrosion. For the treatment of pellets, grains or powders, devices such as screens, screened boxes and racks may be used to hold the treated materials under the surface of the treatment materials. The screens, boxes or racks may be agitated or vibrated to ensure even contact and the dislodgment of air bubbles.

Figure 5:
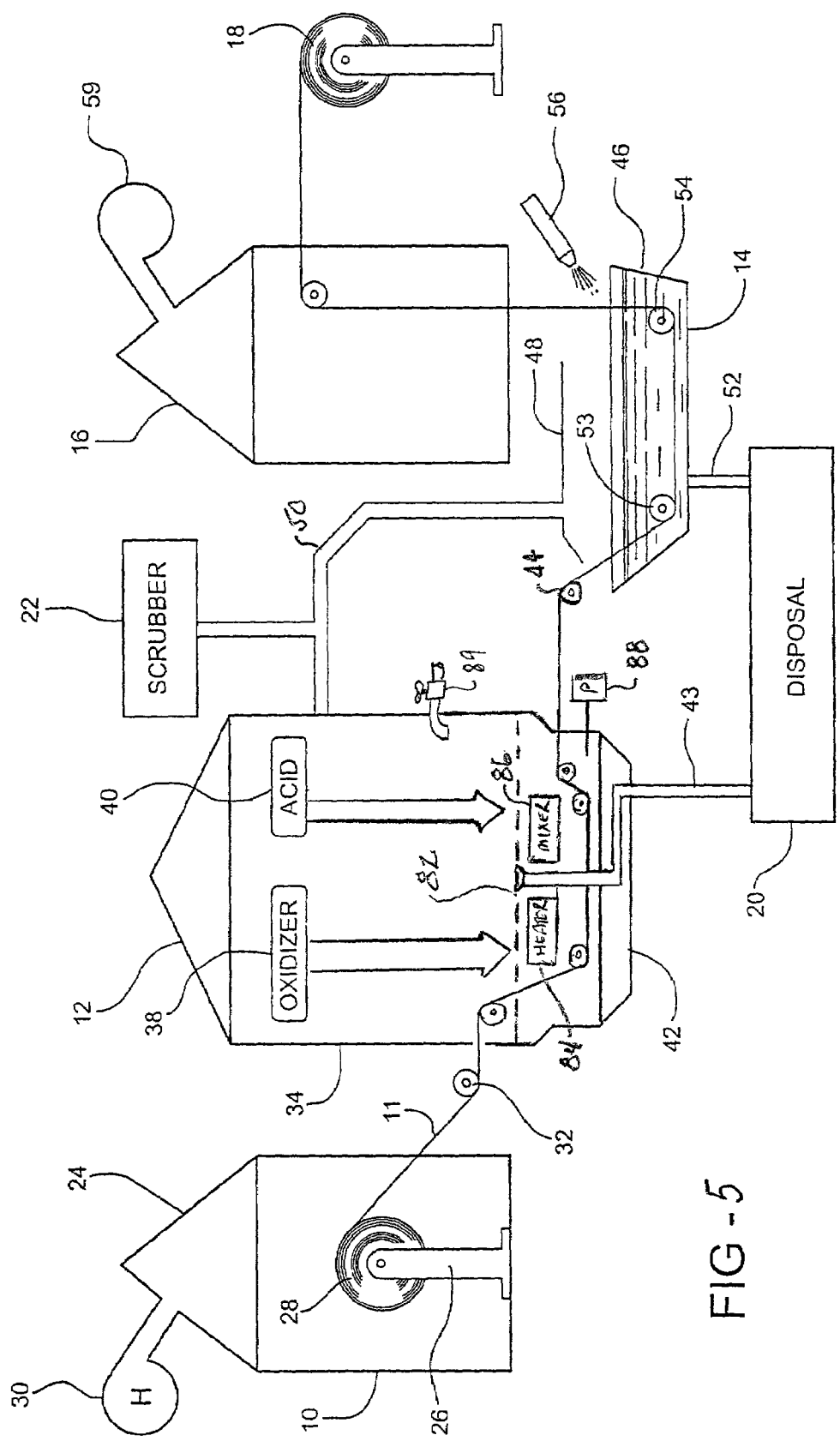
FIG. 5 is a schematic diagram of an alternative apparatus for treating material by immersion.

FIG. 5 illustrates a bath immersion treatment system the general arrangement of which is similar to that of FIG. 1. Identical reference numerals are used to identify identical or substantially similar components as between FIGS. 1 and 5.

In FIG. 5, the sheet material 11 passes from the preheat station 10 to the treatment station 12 where it is immersed in a bath 82 comprising an aqueous mixture of oxidizer provided from a source 38 and activator from a source 40. A glass enclosed immersion heater 84 is used to raise the temperature of the bath to between 100° F. and 180° F.

The oxidizer and acid enter the bath 82 from their respective sources 38, 40 in solid form and, therefore, an agitator 86 is used to stir and mix the bath. Typically the oxidizer is mixed into the water to make an aqueous solution heated to the desired temperature. The activator is thereafter added in solid form. Additional water is provided as necessary from supply 89. A probe 88 is used to monitor pH and temperature and provide either reports or automatic control of bath ingredients and conditions in known ways. The bath 82 is arranged to overflow into the disposal system 20 through pipe 43 as new water and chemical is added.

After immersion treatment, the material moves to the rinsing locations 14, 56 drying station 16 and reeling station 18 as before.

With respect to disposal system 20, the pH of the spent treatment solution should be first raised to a level of 6.5–7.5 using sodium hydroxide in either solid or liquid form. Alternatives to the use of sodium hydroxide (NaOH) are sodium bicarbonate ($NaHCO_3$) and any number of other appropriate bases such as potassium hydroxide (KOH), lime or calcium carbonate ($CaCO_3$), Borax or other bases included in the CR Handbook of Chemistry, 65th Ed., 1985–85, *Weast*. Thereafter the residual chlorine ($Cl_2$) is neutralized using sodium bisulfate ($NaHSO_3$) in either solid or liquid form.

A suitable scrubber may treat the effluent vapor by mixing the effluent vapor with a sprayed solution of dilute (NaOH) in water. Since the only volatile component in the effluent is chlorine, the resulting solution is essentially a bleach which can in itself be marketed as a usable product.

Activators other than succinic acid may be used. For example, dilute acetic acid may also be used, the advantage in such material is that once neutralized it is harmless. Acetic acid, however does have a strong odor.

While the invention has been described with respect to the treatment of rolled sheet material, the apparatus may be readily adapted for the treatment of discrete parts, pellets, grains and powders. Rather than using a de-reeling and reeling apparatus such a that illustrated at 28 and 18, the parts may be mounted on a conveyor belt or in conveyor carriers or located on a pvc rack which is suitable for immersion and/or spray treatment. Care must be taken to avoid bubbles and to provide contact between the treatment materials and the rack only at locations which do not need to be treated. Vibration may be used periodically to adjust or move the parts and/or to dislodge air bubbles.

The treatment intervals are highly dependent on temperature. Treatment time may range from approximately seven-hours at room temperature to less than one-minute at boiling temperature. The optimal temperature vs. time may be from 1 minute at 80° C. to 24 hours at ambient temperature.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for treating polymeric surfaces comprising:

means for continuously conveying polymeric material to be treated through a series of treatment stations;

a first treatment station including a housing and means for simultaneously contacting a surface of the material with an oxidizing agent and an acid for an interval sufficient to impart functional groups derived from said oxidizing agent onto the surface of the polymeric material;

wherein said oxidizing agent is a bivalent oxygen compound selected from the group consisting of oxycompounds of chlorine, oxycompounds of bromine, oxycompounds of iodine; oxycompounds of boron, oxycompounds of nitrogen and mixtures thereof;

a second treatment station including a housing adjacent to the first station with means for rinsing the polymeric material;

means for drying the polymeric material; and means for disposing of the spent oxidizing agent and acid.

2. The apparatus as defined in claim 1 further including a preheating station including a housing and means to heat the air to a sufficient temperature to heat the polymeric material.

3. The apparatus as defined in claim 1 wherein the means for simultaneously contacting comprises a plurality of spray nozzles directed at the material, each having separate inputs for the oxidizing agent and the acid, the separate inputs having means to regulate flow of oxidizing agent and acid to the desired or required amount, each nozzle further having a common output which emits the oxidizing agent and acid in combined form.

4. Apparatus as defined in claim 3 wherein at least some of said nozzles include heaters for elevating the temperature of the sprayed materials.

5. The apparatus as defined in claim 1 wherein the means for simultaneously contacting comprises an immersion bath containing oxidizing agent and acid in an operative ratio.

6. Apparatus as defined in claim 5 further comprising a heater in the bath.

7. Apparatus as defined in claim 5 further including a mixer or agitator.

8. Apparatus as defined in claim 1 wherein the oxidizing agent is NaOCl.

9. Apparatus as defined in claim 1 wherein the acid is succinic acid.

10. The apparatus as defined in claim 1 wherein the housing comprises walls positioned relative to one another so as to maintain the first station and the liberated gas in an isolated environment.

11. The apparatus as defined in claim 1 wherein the means for continuously conveying the polymeric material comprises a power de-reeling stand located within the first treatment station, the de-reeling stand conveying sheet polymeric material from a roll and through the entire apparatus.

12. The apparatus as defined in claim 1 wherein the means for continuously conveying the polymeric material comprises a conveyor and a securing element for discrete articles, pellets, and powders of the polymeric material.

13. The apparatus as defined in claim 1 wherein the means for simultaneously contacting the surface of the polymeric material comprises at least two spray nozzles wherein at least one nozzle supplies the oxidizing agent in an atomized state and at least one nozzle supplies the acid, the nozzles positioned to combine the oxidizing agent with the acid in an operative ratio prior to contacting the polymeric material.

14. The apparatus as defined in claim 13 wherein at least some of said nozzles include heaters for elevating the temperature of the sprayed materials.

15. The apparatus as defined in claim 10 including an air scrubber.

16. The apparatus as defined in claim 15 further comprising a sodium hydroxide introduction device in contact with the air scrubber.

17. The apparatus as defined in claim 11 further comprising:

a bath, the bath containing aqueous neutralizing solution; and a conduit in fluid communication between the bath and the scrubber.

18. The apparatus as defined in claim 1 wherein the means for disposing of the spent oxidizing agent and acid comprises:

a collection chamber;

a conduit in communication between the chamber and the first station;

means for introducing sodium hydroxide the collection chamber in amounts required to adjust the pH of the spent agent and acid combination;

a second chamber;

a conduit in communication between the collection chamber and the second chamber; and means for introducing sodium bisulfate to the second chamber in an amount required to neutralize the resulting chlorine.

19. An apparatus for treating polymeric material surfaces comprising:

a conveyor configured to movably convey the polymeric material to be treated;

a first treatment station in communication with the conveyor, the first treatment station comprising:

a housing configured to isolate an interior space;

at least two spray nozzles wherein at least one nozzle supplies an atomized oxidizing agent and at least one nozzle supplies an acid, the nozzles positioned to combine the oxidizing agent with the acid in an operative ratio prior to contacting the polymeric material;

a second treatment station located downstream of the first treatment station, the second treatment station including a housing defining an interior and a neutralizing bath located within the housing;

a dryer located downstream of the second treatment station; and a disposal treatment station in communication with the first treatment station, the disposal treatment station comprising:

a first chamber including a first conduit introducing the spent oxidizing agent and acid to the chamber from the first treatment station, a second conduit introducing sodium hydroxide to the chamber, and a third conduit; and a second chamber in communication with the first chamber by the third conduit, the third conduit introducing the pH adjusted solution from the first chamber, a conduit introducing sodium bisulfate to the second chamber, and an effluent conduit in communication between the second chamber and a downstream means for disposal.

* * * * *